US005812625A

United States Patent [19]

Potier et al.

[11] Patent Number: 5,812,625

[45] Date of Patent: Sep. 22, 1998

[54] APPARATUS AND METHOD FOR ACCURATELY MEASURING THE TIME OF AN EVENT

[75] Inventors: Thierry Potier, Auffargis; Michel Geesen, Antony, both of France

[73] Assignee: Dessault Electronique, Saint Cloud, France

[21] Appl. No.: 605,634

[22] Filed: Feb. 22, 1996

[30] Foreign Application Priority Data

Feb. 22, 1995 [FR] France .................................. 95 02058

[51] Int. Cl.[6] .................................................... G01M 3/00

[52] U.S. Cl. ............................................................. 377/20

[58] Field of Search ................................................ 377/20

[56] References Cited

U.S. PATENT DOCUMENTS

| | | | |
|---|---|---|---|
| 4,408,895 | 10/1983 | Geesen | 368/118 |
| 4,499,589 | 2/1985 | Geesen | 377/55 |
| 5,214,680 | 5/1993 | Gutierrez, Jr. et al. | 377/20 |
| 5,228,066 | 7/1993 | De Vane | 377/20 |
| 5,440,602 | 8/1995 | Gimmler et al. | 377/20 |
| 5,488,645 | 1/1996 | Mori et al. | 377/20 |

FOREIGN PATENT DOCUMENTS

| | | |
|---|---|---|
| 1 520 487 | 8/1968 | France . |
| 1 578 540 | 8/1969 | France . |
| 28 55 819 | 6/1979 | Germany . |

*Primary Examiner*—Margaret Rose Wambach
*Attorney, Agent, or Firm*—Pollock, Vande Sande & Priddy

[57] ABSTRACT

A clock generates clock pulses defining a plurality of clock cycles. A circuit is connected to receive the clock pulses and measure a primary time of occurrence of an event with respect to a clock cycle. Logic circuits are provided to generate a timing pulse representing a time interval between the event and a clock pulse of the subsequent clock cycle. The timing pulse begins at the time of the event and ends on the occurrence of a subsequent clock pulse. A filter circuit receives the timing pulse and generates in response thereto a signal having an amplitude representing the duration of the timing pulse. The amplitude is measured to determine the width of the timing pulse thereby identifying the occurrence of the event with respect to a subsequently occurring clock pulse.

13 Claims, 3 Drawing Sheets

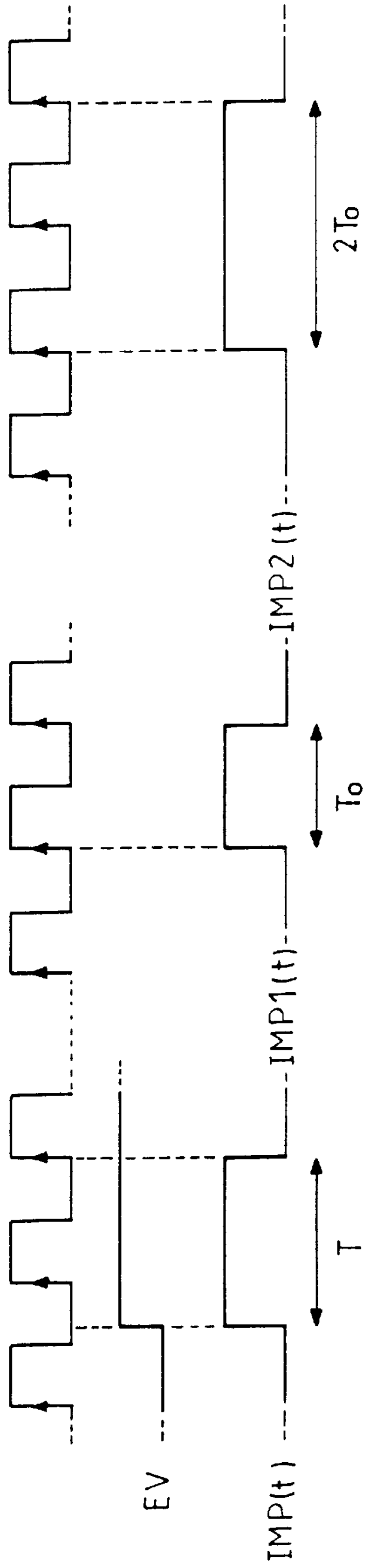
FIG.4A
FIG.4B
FIG.4C
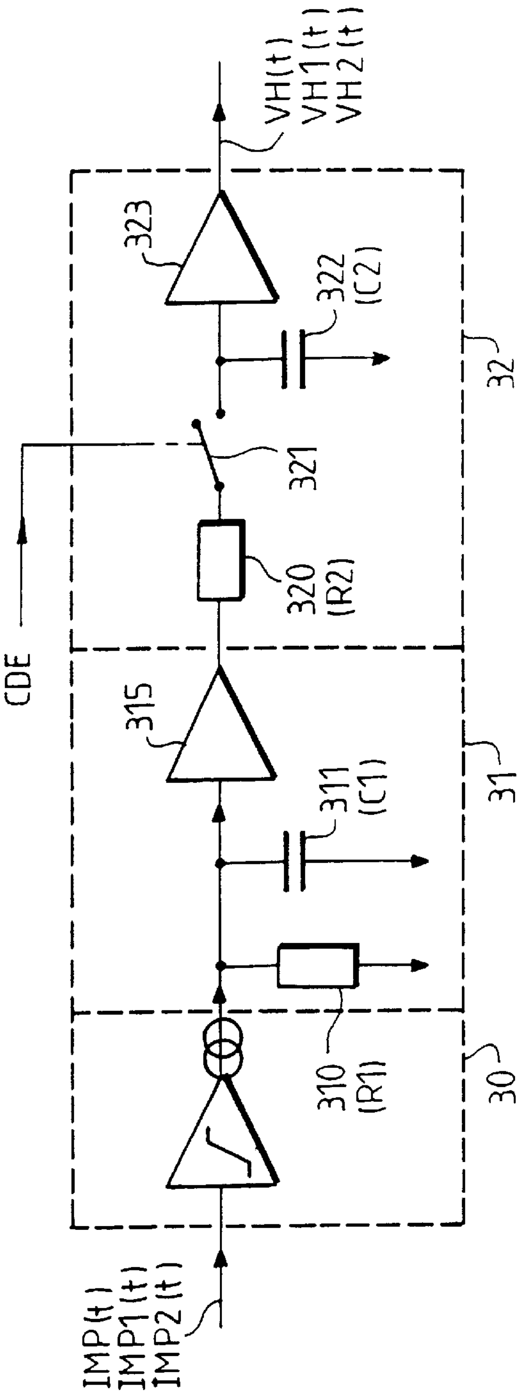
FIG.5

APPARATUS AND METHOD FOR ACCURATELY MEASURING THE TIME OF AN EVENT

BACKGROUND OF THE INVENTION

1. Field of the Invention

The present invention relates to chronometry, the measurement of time, and particularly to the very accurate timing of an event relative to the timing of clock signals.

One of the aspects of chronometry is the timing of an event in relation to a time reference.

It is known for this chronometry to be carried out electronically, but it is particularly difficult when very great accuracy is needed, as for example for the timing of the arrival of laser beams for measuring distance or for other time based operations such as the synchronisation of distant clocks.

An event may be considered in this case as a transition of an electrical signal, representing the arrival of a laser beam, which changes from a low to a high level. The starting point of the chronometry is assumed to be known.

2. Description of Prior Art

Patent specification FR-B-2 492 563 and more particularly FR-B-2 493 553 describe solutions in which the conceivable accuracy is below a nanosecond, as well as other applications where this accuracy is desired.

In the latter of the aforesaid specifications an apparatus is proposed which comprises:

the clock logic means for generating a timing pulse associated with the timing internal between the event and a clock pulse having a position known with respect to the event, a time constant circuit receiving the timing pulse to generate in response an electrical signal of a duration greatly than to that of the timing pulse, and means for measuring a physical value relative to the electrical signal and representative of the duration of the timing pulse thereby enabling a secondary chronometry of the event.

According to FR-B-2 493 553, the timing pulse starts with the event and ends with the following clock pulse. The time constant circuit is a double integrator using the rapid charge of a capacitor during the timing pulse, followed by a slow discharge. The discharge time defines a second timing pulse. The circuit can be adjusted so that the duration of the second timing pulse is increased according to a known rule, by a relationship with the duration of the first timing pulse (whence the timing extension). A secondary counter then measures the duration of the second pulse which provides the secondary fine chronometry of the event, preferably relative to the same clock which generates the timing pulse.

SUMMARY OF THE INVENTION

The present invention has an object to provide a method and an apparatus whereby a greater accuracy is achieved below a hundred and preferably below ten picoseconds. More specifically it is an object of the present invention to firstly provide, a logic means adjusted to produce a timing pulse which commences at a time associated with the event and finishes at a clock pulse which is at least the second clock pulse following the start of the timing pulse. Consequently, the duration of the timing pulse is greater than or equal to a clock period T0 between T0 and (k+1)·T0, where k is at least equal to 1.

In a further object of the invention, the time circuit is a filter of selected characteristics, having a time constant greater than, and preferably much greater than, the nominal duration of the timing pulse.

In a yet further object of the invention the measuring means operates on a chosen portion of the response of the filter for the timing pulse.

Preferably the filter is a low pass filter, the portion chosen for the response is approximately the maximum of the response, and it may be observed that the amplitude of this portion is thus representative of the duration of the timing pulse.

BRIEF DESCRIPTION OF THE DRAWINGS

Other features and advantages of the invention will appear with reference to the detailed description hereafter as in the accompanying drawings, in which:

FIG. 4A to 4C are three groups of wave form diagrams for explaining the calibration of the device of the invention;

FIG. 5 is a detailed arrangement of a group of elements FPB, APO and SB corresponding to the embodiment of FIG. 1; and, FIG. 6 is a wave form timing diagram explaining the operation of the device of the invention as regards the arrangement of FIG. 5.

The accompanying drawings have a number of elements of a certain character which is difficult to define completely by the text. Consequently, these are an integral part of the description and may assist in defining the invention.

DESCRIPTION OF THE PREFERRED EMBODIMENTS

It has already been indicated that the invention concerns very precise chronometry. In the desired measurements of under a nanosecond it is only possible to time an event following a determined reference time which is more easily perceptible when it is substantially greater than a nanosecond.

Figure 1:
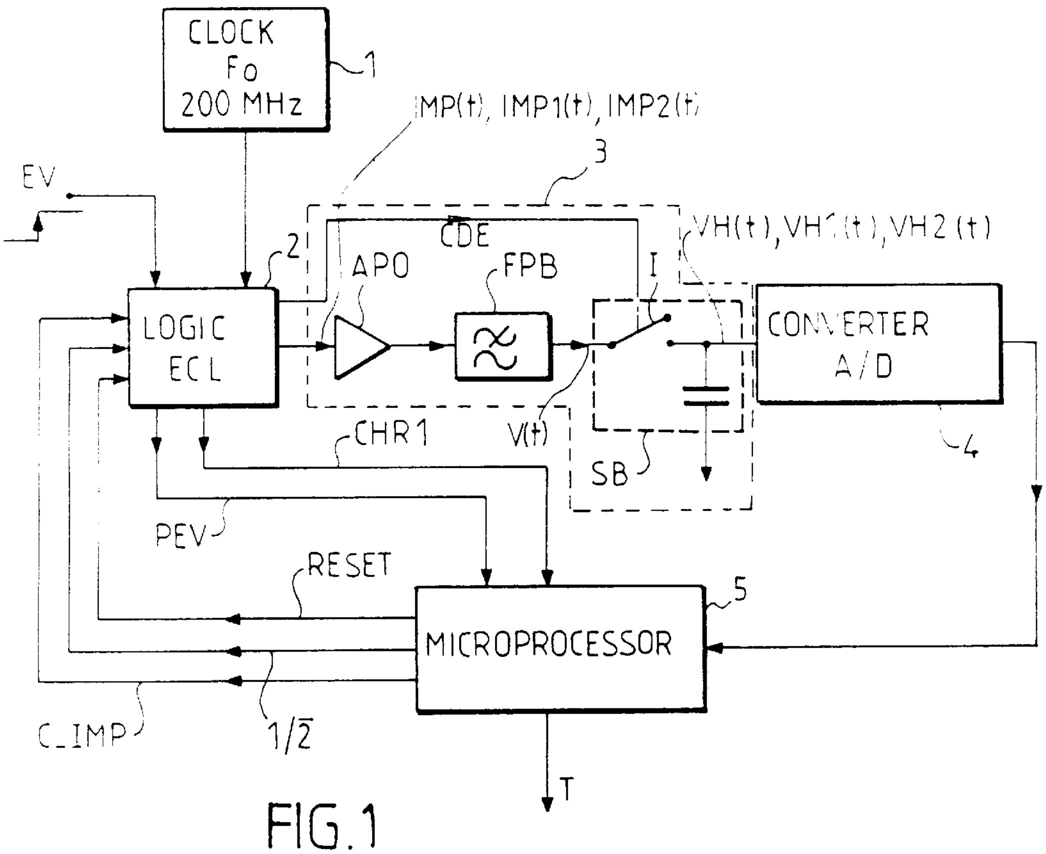
FIG. 1 is a simplified electrical diagram of one embodiment of the present invention.

In FIG. 1, the circuit has a clock 1 operating at a frequency $F_0$ which is for example 200 MHZ. This clock has attainable by one skilled in the art. The signal transmitted by this clock, serves as the first input signal for unit 2 which includes logic circuits.

This unit 2 has as a second stepped input signal EV. The stepped signal EV represents an event in time. The step represents for example the slope of a signal from a photodetector receiving a laser beam.

In a particularly effective embodiment, the present invention sets out to achieve a timing accuracy of 2 to 3 picoseconds (RMS) for a stepped electrical stepped signal where the slope time is some 200 picoseconds.

In view of the desired accuracy, it is proper to use electronic logic circuits which switch very rapidly. For this reason the logic circuits assembled in unit 2 use ECL technology.

Figure 2:
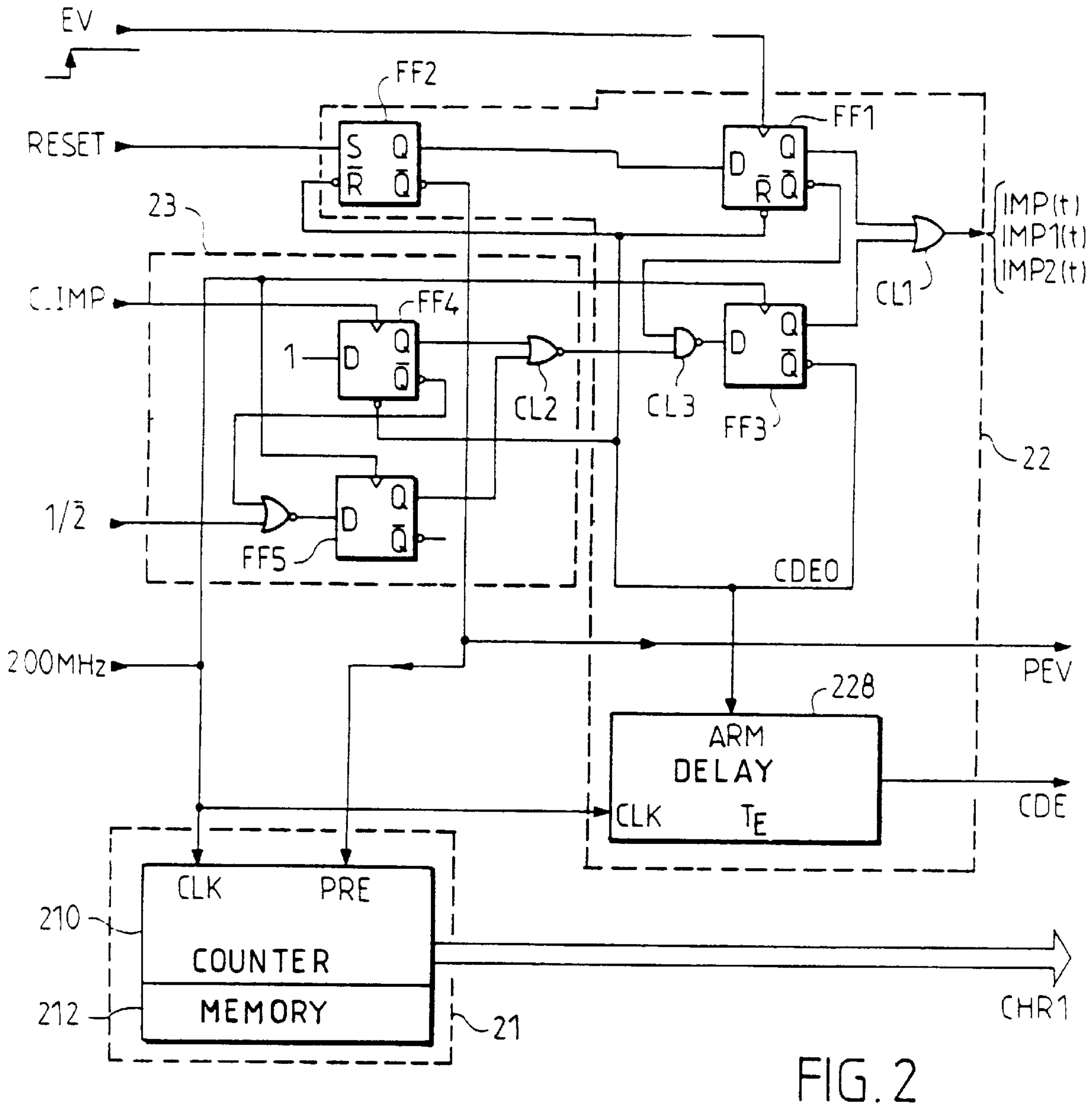
FIG. 2 is a detailed diagram of the logic unit 2 of FIG. 1.

To describe unit 2 in more detail see FIG. 2 where the logic components are shown as flip-flops.

For the reason already indicated, the embodiment first starts with a primary count. For this purpose, part 21 of unit 2 has a counter 210, receiving at a first input CLK impulses of frequency $F_0$ , and for a period $T_0=1/F_0$ coming from clock 1. The start of the counting commences at a TRF instant, defined also by a step signal or a pulse to validate counter 210. Counting stops at the moment when a signal representing step EV is applied to the second input PRE of counter 210, having been routed through components FF1, CL3, FF3 and FF2.

At an appropriate moment the state of the counter is retained for example in a register 212, which is in this case suitable to provide a digital signal CHR1, representing the primary chronometry, in principle which is not ambiguous but where the accuracy is limited by the period of the clock $T_0$. The method of transferring the state of counter 210 in register 212 can depend on whether the counter 210 is synchronous or asynchronous. This effect of the indicators may be found in FR-2 492 563, already cited.

Figure 3:
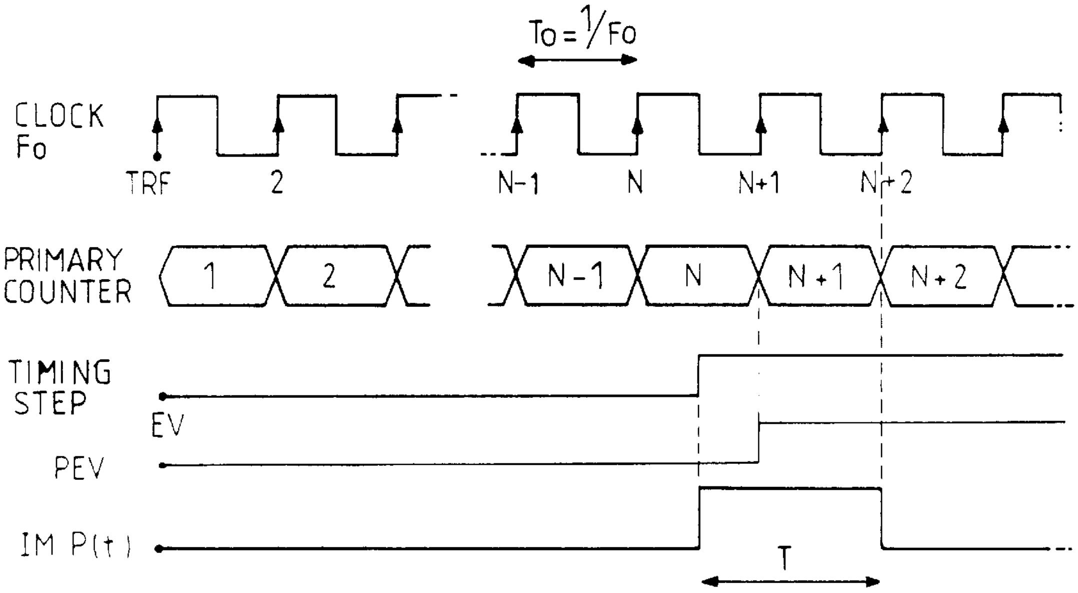
FIG. 3 shows four wave form diagrams which correspond to each other and which are useful for the understanding of FIG. 1.

The process is described in relation to the first four lines of the chronogram of FIG. 3. In the example shown, timing step EV (third line from the top) occurs during the N'th state of counter 210, from reference time TRF. The numerical value CHR1 is deducted by means of synchronous command PRE and N or N+1 according to the construction of part 21.

Logic unit 2 also comprises a stage 22, the function of which is to generate a timing pulse IMP(t) (more precisely an electrical signal forming a timing pulse), associated with the timing internal between event EV and a clock pulse of known position relative to this event. IMP(t) results from a logical operation carried out by logic component CL1, between step EV from FF1 and the signal from the third flip-flop component FF3 which represents the positional clock pulses produced by clock 1. IMP(t) is shown on the last line of FIG. 3.

In this example, the clock pulse with a known position corresponds to the N+2'th pulse of clock 1, that is the second clock pulse following step EV. The timing pulse, referenced IMP(t) is thus obtained.

But, FF3 also delivers at a second output, a signal CDEO the rising leading edge of which coincides with the end of the timing pulse IMP(t). This pulse CDEO is applied to the first input ARM of a digital delay circuit 228 suitable to provide a timing delay $T_E$, and where the time basis is the signal from clock 1 applied on its second input CLK which provides at an output of delay circuit 228 a signal CDE which commands the sampling of the event which will be described below.

After generating pulse IMP(t) by a step EV, the output Q of FF1 is maintained at 0 due to the memory of FF2, which has the effect of ignoring any later steps EV as long as a RESET=1 command has not been sent.

Preferably unit 2 also has a sub-assembly 23 to generate two calibration pulses referenced IMP1(t) and IMP2(t), of a duration $T_0$ and $2T_0$ respectively. This sub-assembly 23 has more particularly two flip-flop components FF4 and FF5, respective outputs of which are coupled by a second logic component CL2 which passes the resultant logic operations to FF3.

The synthesis of the calibration pulses takes place when the input EV is deactivated, that is to say after an impulse IMP(t) and before the RESET=1 command (the outputs Q of FF1 and FF2 are then at 0). This synthesis is commanded by a rising front of a signal C_IMP and the choice of IMP(t) or of IMP2(t) depends on the state of signal $1/\overline{2}$:

- if $1/\overline{2}$=1: output Q of FF5 is held at 0 and IMP(t) is generated by FF3, FF4, CL2 and CL3 via CL1.
- if $1/\overline{2}$=0: FF5 is active and the double length impulse IMP2(t) is generated by FF3, FF4, FF5, CL2 and CL3 via CL1.

The control signals C_IMP, $1/\overline{2}$ and RESET are outputs from a microprocessor 5 which will be described below.

As shown in FIG. 4 pulses IMP(t) and IMP2(t) enable the provision of a frame of the duration of pulse IMP(t).

Thus pulse IMP(t) (FIG. 4B) corresponds to the minimum duration of IMP(t) which is a period $T_0$ of a clock. Whilst pulse IMP2(t) (FIG. 4C) corresponds to the maximum duration of IMP(t) which is a period $2T_0$.

Returning to FIG. 1, the three signals IMP(t), IMP1(t) or IMP2(t) are available in the same way, the sequence being controlled by microprocessor 5 as will be described.

The pulse at the output of the logic unit ECL 2 is applied to an amplifier APO, followed by a low pass filter FPB, then a memory circuit SB, which is preferably a sample-and-hold circuit or a track-and-hold circuit.

The filter, amplifier and memory circuit are described in more detail in FIG. 5.

The pulses are first of all applied to a circuit 30 which comprises a limiting amplifier having a current output. A transistorised differential amplifier may be used.

The output of stage 30 is applied to a first filter stage 31. It has a resistor 310 of value R1, a capacitor 311 of value C1 and an amplifier 315. The amplifier chosen in this example is a rapid operating and low noise amplifier such as the ANALOG DEVICES company's part AD811.

In an advantageous embodiment the time constant $t_1$ of the circuit is provided by components 310 and 311, formed by the product of $R_1 \cdot C_1$, which is chosen equal to about 100 nanoseconds.

The output of amplifier 315 is applied to a second filter stage 32 starting with a resistor 320 of value $R_2$, followed by a rapid switching device 321, a capacitor 322 having a value C2, and then an amplifier 323. The amplifier is preferably a rapid low noise amplifier with JFET type inputs.

The time constant $t_2$ of the circuit formed by components 320 and 322 formed by the product $R_2 \cdot C_2$, is in an advantageous embodiment chosen to be about 500 nanoseconds.

In this assembly the lesser time constant $t_1$, is placed before the greater time constant $t_2$ so as to reduce the effect of the noise of amplifier 315 on the measurement of time T.

It also may be seen that the assembly comprising the switch 321 and capacitor 322 (C2) defines the memory circuit which is in the example shown, a track-and-hold circuit which is for holding the amplitude of the signal at a moment defined by command CDE after which the amplitude could be measured by an analog-digital converter 4 the digital output of which is applied to a microprocessor 5.

Stage 30, not shown in FIG. 1 translates the ECL logic levels and ensures an improved quality of pulses IMP(t), IMP1(t) and IMP2(t). Stages 31 and 32 form amplifier APO, the low pass filter FPB track-and-hold circuit SB of FIG. 1. In fact in the assembly described, the low pass filter comprises two stages 31 and 32 and then it includes the track-and-hold circuit.

Of course a sample-and-hold circuit could be used instead of the track-and-hold circuit but this would complicate the assembly.

The assembly shown in FIG. 5 is intended to memorize the output signals from filter $t_2$ for a chosen instant so as to send it to the analog-digital converter 4. A FLASH type analog-digital converter could be used which would not require such a memory but would have limited resolution.

Furthermore, certain analog-digital converters already have a sample-and-hold circuit which would simplify the assembly. However, in view of the accuracy required these support with difficulty the kind of impulses of the signals being processed.

Microprocessor 5 ensures the control of the assembly of the device. It generates the RESET command signals C_IMP and 1/2, which enable it to be informed continuously of the measurement and the signal which it receives from the analog-digital converter 4, is an IMP(t) impulse corresponding to an actual step EV, or whether it is one or other of the calibration impulses IMP1(t) or IMP2(t).

The logic unit 2 can also be provided with an output signal PEV designed to inform the microprocessor 5 of the arrival of a step input signal EV.

Figure 6:
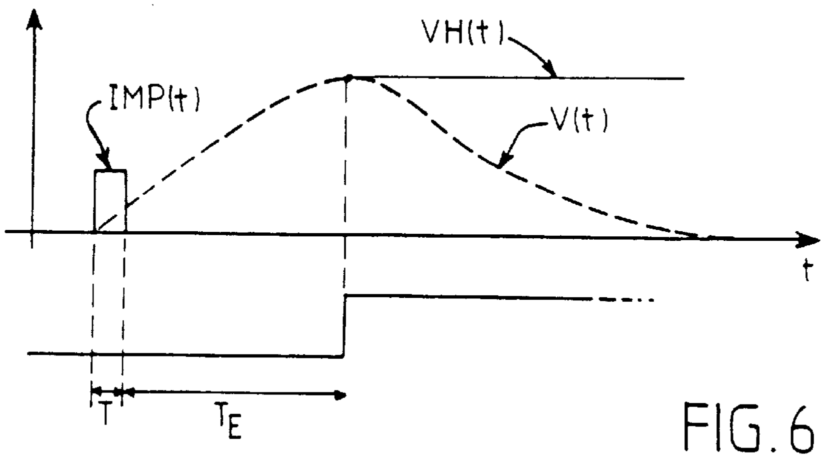

FIGS. 1 and 6 assist in understanding the function of the device of the invention.

Pulse IMP(t) is very short. Its maximum duration is at the most equal to twice the period $T_0$ of clock 1, that is to say $T_{max}$=10 nanoseconds ($F_0$=200 Mhz).

The applicant has observed that when a pulse is applied to a low pass filter having a time constant greater than the duration of the pulse, the output signal of the filter approaches an "impulse" response, which is considerably "stretched" in time as may be seen in the broken line curve V(t) of FIG. 6. In specialist jargon, an "impulse" response is obtained when the filter receives at its input a signal represented the mathematical representation as a "Dirac".

Furthermore, the Applicant has observed that if one is near the maximum of the response V(T) (or one of the maximums of the response) the amplitude of the output signal from the filter, is a representation of the duration of the pulse IMP(t), and is independent of the exact waveform of the pulse. In effect, it turns out that, by a suitable choice of sampling moment and the filtering parameters, a signal can be obtained at the output of the filter having amplitude which is practically a linear function with respect to time.

Also the time constant resulting from filtering is very good considering the maximum duration of the pulse at the input of the filter, the better is the linearity.

The linearity can be improved further by using a filter with two time constants in cascade $t_1$ and $t_2$ as shown in FIG. 5.

In FIG. 6, T represents the duration of impulse IMP(t) whilst $T_E$ is equal to the delay introduced by the delay circuit 228 described with reference to FIG. 2, which ensures by command signal CDE the control of switch I of the track-an-hold circuit SB, which enables the sampling.

In the embodiment described, the time interval $T_E$ can be chosen to be about 200 nanoseconds.

When the memorised signal VH(t) has been obtained it is then subject to analog-digital conversion by means of converter 4 which is for example ANALOG DEVICES Company part No. AD779.

The same treatment is given to the calibration pulses IMP1(t) and IMP2(t), this allows there to be obtained measured values VH1(t) and VH2(t) from the response of the filter for the respective minimum and maximum ($T_0$ and $2T_0$).

As previously indicated the output from converter 4 is applied to microprocessor 5 which is for example the INTEL Company as part No. 87C51.

When a pulse IMP(t) for measuring occurs, the very good linearity, which has been obtained by the suitable choice of the time constants of the device, enables the calculation of the associated duration of the IMP(t) signal by interpolation between those which correspond to the minimum value IMP1(t) and those which correspond to the maximum value IMP2(t).

The applicant has also observed that there is a noise effect from measuring duration T.

To reduce this noise, the application of the calibration pulses IMP1(t) and IMP2(t) are repeated M times, and the mean value is determined for each of them. It has been observed that the mean values gives satisfactory results when M is equal to 4 or more. Where M is greater than 8 there does not seem to be any significantly additional improvement.

The calibration operation can be carried out in different ways. One can initially carry out the calibration from time to time, or indeed only when first putting the apparatus into use. It is preferable to calibrate at a time nearer the present time, that is as near as possible to the actual T measurement.

This can be done either before the actual measurement if that can be foreseen, or if not, after measurement.

Of course the present invention is not limited to the embodiment described.

Firstly, the duration of the timing pulse IMP(t) can be lengthened, that is to say, instead of being in the interval of the durations which are from $T_0$ to $2T_0$ it can be between $2_0$ to $3T_0$ or from $3_0$ to $4T_0$.

Then, although the invention is described here using for the response a low pass filter which has the particular advantage of being very suitable for inclusion in a track-and-hold circuit, the invention could be carried out by using an impressed response with other types of filters providing their characteristics are suitably chosen. Finally, it is also possible to generate a third calibration pulse of a duration $3T_0$ so as to effect a parabolic interpolation enabling the minimalisation of residual non-linear effects in the second order.

While the invention has been particularly shown and described with reference to the preferred embodiments thereof, it will be understood by those skilled in the art, that the foregoing and other changes in form and details can be made therein without departing from the spirit and scope of the invention.

What is claimed is:

1. An apparatus for accurately measuring the time of an event comprising:

a clock for generating clock pulses which define a plurality of clock cycles;

means connected to said clock for measuring a primary time of occurrence of the event with respect to a subsequent clock cycle;

logic means for generating a timing pulse representing the time interval between the event and a clock pulse of said subsequent clock cycle, said timing pulse beginning at the time of said event and ending at the time of a subsequently occurring clock pulse;

a filter circuit means for receiving the timing pulse and generating in response thereto an electrical signal shaped by a response function of said filter having a duration greater than said timing pulse duration; and means for measuring a value of said electrical signal at a specific portion of said response function, which is related to the duration of said timing pulse, to provide a fine measurement of said time of occurrence of said event with respect to said subsequently occurring clock pulse.

2. An apparatus according to claim 1 wherein said filter circuit means has a time constant greater than the maximum duration of the timing pulse.

3. An apparatus according to claim 2 wherein the time constant is at least equal to five times the duration of the timing pulse.

4. An apparatus according to claim 3 wherein the time constant is at least equal to twenty times the maximum duration of the timing pulse.

5. An apparatus according to claim 1 wherein the filter is a low pass filter, and wherein the measuring means measures the maximum amplitude of the electrical signal which is representative of the duration of the timing pulse.

6. An apparatus according to claim 5 wherein the low pass filter has a dual time constant.

7. An apparatus according to claim 1 further comprising a memory circuit enabled at a selected time with respect to the clock pulse which marks the end of the timing pulse.

8. An apparatus according to claim 7 wherein the low pass filter has a dual time constant, and comprises two successive stages having respectively the two time constants and where the second stage has the memory circuit.

9. An apparatus according to claim 7 wherein the memory circuit is a track-and-hold circuit.

10. An apparatus according to claim 1 further comprising means to repetitively generate calibration events in the place of said timing pulse to calibrate said means for measuring.

11. An apparatus according to claim 10 wherein the calibration events correspond to the maximum and minimum durations of the first timing pulse.

12. An apparatus according to claim 10 wherein each calibration event is repeated M times, and wherein a mean of the calibration events repeated M times is used to calibrate each measured event.

13. A method for measuring the time of an event comprising:

generating clock pulses which define a plurality of clock cycles;

measuring a primary time of occurrence of the event with respect to a subsequent clock cycle;

generating a timing pulse representing the time interval between the event and clock pulse of said subsequent clock cycle, said timing pulse beginning at the time of said event and ending at the time of a subsequently occurring clock pulse;

filtering the timing pulse with a filter and generating in response thereto an electrical signal shaped by a response function of said filter and having a duration greater than said timing pulse duration; and measuring a value of said electrical signal at a specific portion of said response function which is related to the duration of said timing pulse, to provide a fine measurement of said time of occurrence of said event with respect to said subsequently occurring clock pulse.

* * * * *